(12) United States Patent
Saar et al.

(10) Patent No.: US 7,921,291 B2
(45) Date of Patent: Apr. 5, 2011

(54) METHOD AND COMMUNICATION SYSTEM FOR RELEASING A DATA PROCESSING UNIT

(75) Inventors: Eva Saar, Griesheim (DE); Bernhard Loehlein, Erlenbach (DE); Klaus Huber, Darmstadt (DE); Matthias Gunkel, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 753 days.

(21) Appl. No.: 10/550,232

(22) PCT Filed: Feb. 9, 2004

(86) PCT No.: PCT/DE2004/000224
§ 371 (c)(1),
(2), (4) Date: Mar. 6, 2006

(87) PCT Pub. No.: WO2004/086264
PCT Pub. Date: Oct. 7, 2004

(65) Prior Publication Data
US 2006/0179316 A1    Aug. 10, 2006

(30) Foreign Application Priority Data
Mar. 21, 2003   (DE) .................................. 103 12 774

(51) Int. Cl.
*H04L 9/32* (2006.01)
*G06F 11/30* (2006.01)
*G06F 15/16* (2006.01)
*H04N 7/16* (2006.01)
*H04N 7/173* (2006.01)
*G10L 21/00* (2006.01)

(52) U.S. Cl. ........ 713/170; 713/175; 713/176; 713/193; 709/206; 709/207

(58) Field of Classification Search .................. 713/170
See application file for complete search history.

(56) References Cited

U.S. PATENT DOCUMENTS
6,687,800 B1 * 2/2004 Nassor .......................... 711/159
2001/0056533 A1  12/2001 Kilian et al.

FOREIGN PATENT DOCUMENTS
DE         19824787         12/1999
(Continued)

OTHER PUBLICATIONS

Jayaram Bobba, Neelam Goyal, Mark D. Hill, Michael M. Swift, David A. Wood, "TokenTM: Efficient Execution of Large Transactions with Hardware Transactional Memory", Jun. 2008, ISCA '08: Proceedings of the 35th Annual International Symposium on Computer Architecture, Publisher: ACM, pp. 127-138.*

(Continued)

*Primary Examiner* — Michael Pyzocha
*Assistant Examiner* — Courtney D Fields
(74) *Attorney, Agent, or Firm* — Kenyon & Kenyon LLP

(57) ABSTRACT

The invention relates to a method and a communication system for releasing a data processing unit used for processing project data of a selected project. In order to obtain project-related release of a data processing unit (90), a client requests a user right for the data processing unit (90) used for processing the project data that is part of a predetermined project. A first signature (I) is verified as to the correctness thereof. The data processing unit (90) is released to process the project data that is part of the selected project only if the verification process has established that the first signature (I) is correct.

10 Claims, 3 Drawing Sheets

FOREIGN PATENT DOCUMENTS

Figure 1:
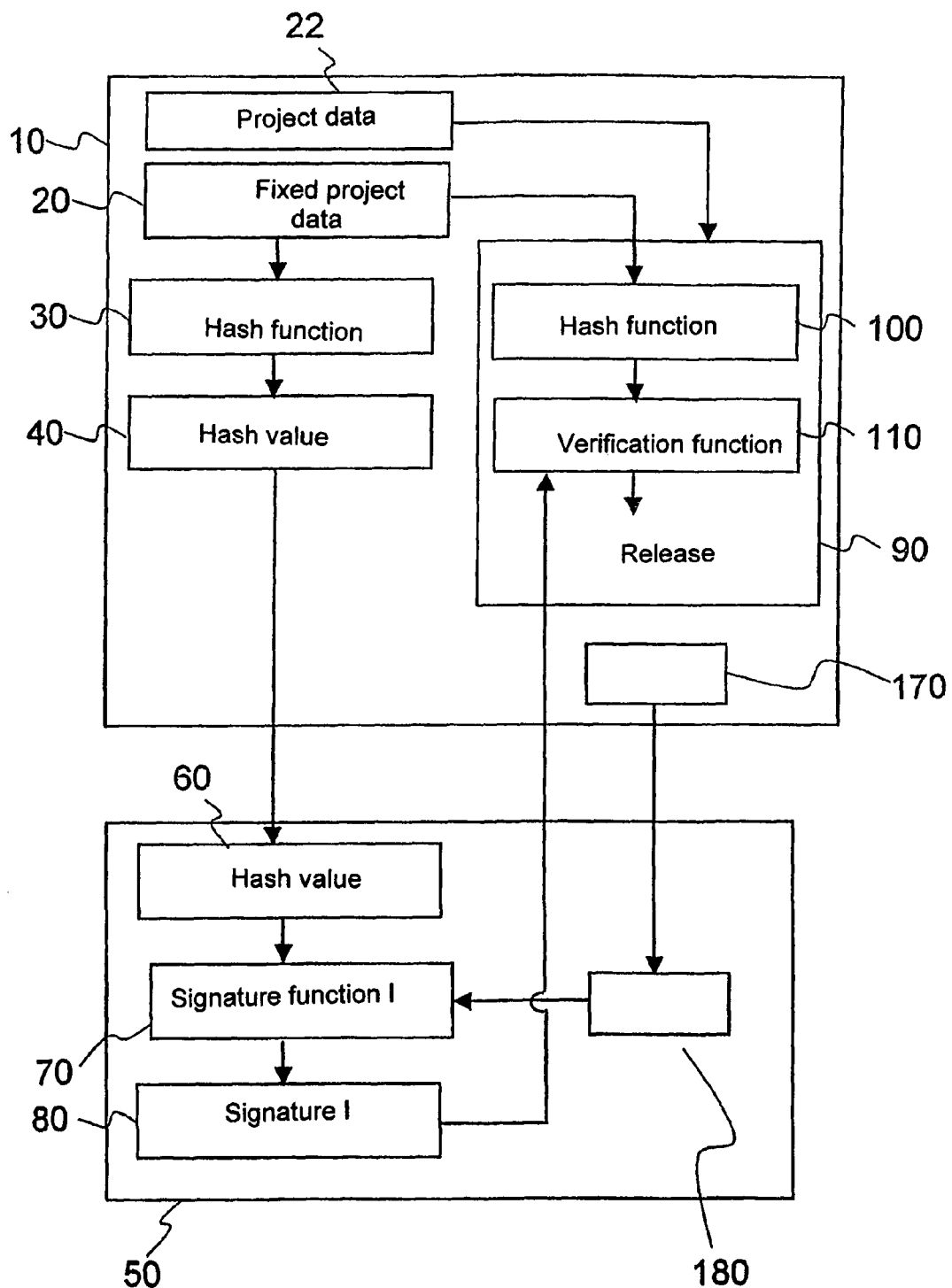

| | | |
|---|---|---|
| EP | 0 915 600 | 5/1999 |
| EP | 1134644 | 9/2001 |
| EP | 1307050 A2 * | 5/2003 |

OTHER PUBLICATIONS

PCT International Search Report for PCT/DE2004/000224, mailed on Aug. 18, 2004.

* cited by examiner

METHOD AND COMMUNICATION SYSTEM FOR RELEASING A DATA PROCESSING UNIT

The present invention relates to a method and a communication system for releasing a data processing unit for processing project data of a selected project.

One field of application for the present invention is the usage, with costs, of a software for processing a project.

A technical objective of the present invention can be seen in making available a method and a communication system which permit a project-dependent release or use of a data processing unit.

A basic idea of the present invention can be seen in that a client would like to have project data of a specific project processed with the aid of a software and/or hardware component, hereinafter also known as data processing unit. However, first the client must acquire for him/herself a right to use the data processing unit for processing the one specific project. Consequently, a specific release signal is generated which causes the data processing unit to process only the project data belonging to the project. The data processing unit processes no other data so long as no usage right for the use of the data processing unit exists for these data.

The technical objective indicated above is achieved, first of all, by a method as recited in claim 1.

According to that, a client requests the usage right for the use of a data processing unit, in order to process the project data belonging to a predetermined project. Subsequently, a first signature is generated, in that the predetermined project data belonging to the project are signed in particular by a signature device. The first signature is verified as to its correctness. The data processing unit is only released or enabled to process the project data belonging to the selected project if the first signature has been verified as correct.

The data processing unit which is assigned to the client and which can be a component of a computer, is expediently connected to the signature device via a communication network. In this case, the predetermined project data can be transmitted by E-mail, for example, via the communication network to a usage-permission generating device in which the first signature is generated. The usage-permission generating device may be a computer of the manufacturer or provider of the data processing unit.

To be able to ensure that the predetermined project data remain secret during the transmission to the usage-permission generating device and even from the usage-permission generating device itself, the predetermined project data are cryptographically protected using a hash function. The predetermined, cryptographically protected project data are then transmitted via the communication network to the usage-permission generating device, the first signature being generated in that the predetermined, cryptographically protected project data are signed by the signature device.

The hash function compresses the predetermined project data to form a hash value. A hash value has the feature that it is not possible to infer the original project data from this hash value. Moreover, hash values have the characteristic that no two different project data can be found which yield the same hash value.

To allow the provider of the data processing unit to make sure that the predetermined project data, which must be signed to release the data processing unit, come from a specific client, a second signature is generated on the client side by signing the predetermined project data. The predetermined project data and the second signature are then transmitted to the usage-permission generating device. The correctness of the second signature is verified in the usage-permission generating device. The signature device generates a first signature from the predetermined project data only if the second signature is correct.

In similar manner, a second signature can be generated on the client side by signing the predetermined project data, cryptographically protected beforehand. The predetermined, cryptographically protected project data and the second signature are again transmitted to the usage-permission generating device. The second signature is verified as to correctness in the usage-permission generating device. The first signature is generated from the predetermined, cryptographically protected project data only if the second signature is correct.

According to a further development of the present invention, the project-dependent usage of the data processing unit may be with costs. Therefore, an invoice data record for usage of the data processing unit is generated as a function of the predetermined project data of a selected project. This invoice data record corresponds to an invoice which must be paid by the client. The amount of the invoice, which corresponds to the invoice data record, can depend upon how much and which project data are defined as predetermined project data by the client or the provider of the data processing unit.

To permit usage of the data processing unit with costs, alternatively the client may initially purchase a plurality of value units in advance, which are devalued accordingly in response to a request by the client for a usage right. In this design approach, it is possible to provide that the first signature is only formed in the signature device when the devaluation of an appropriate number of value units has been confirmed to the signature device. In other words, the client must first pay for the use of the data processing unit before it is released.

The technical objective indicated above is likewise achieved by a communication system as recited in claim 8.

The communication system includes a computer, assigned to a client, in which a data processing unit is implemented. As already mentioned above, the data processing unit may be software and/or hardware components. The computer also has a memory device in which predetermined project data of at least one project to be processed are stored. It should be noted that the predetermined project data may be stipulated beforehand by the software provider or by the client himself. In addition to the predetermined, i.e., fixed project data, there are variable project data which may be changed by the client within a selected project without having to request a new release of the data processing unit. The communication system further includes a usage-permission generating device, assigned to the computer, which has a first signature device for generating a first signature from the predetermined project data of a selected project. Furthermore, the computer has a device for verifying the first signature and for releasing the data processing unit, which releases the data processing unit for processing the project data belonging to the selected project only if the first signature is correct. The verification device may be based on an asymmetrical signature function, also known under the name "public key cryptography." In the case of the asymmetrical signature function, each subscriber, in the present case the client and the software provider, is assigned a private, secret key and a so-called public key. Since the asymmetrical signature function is generally known, there is no further discussion of it here.

According to one advantageous refinement, the computer and the usage-permission generating device are connectable to each other via a communication network, e.g., the Internet, a telephone network or similar networks suitable for transmitting data. Accordingly, the computer and the usage-permission generating device each have an interface for the connection to this communication network. To permit protected transmission of the predetermined project data of a selected project via the unprotected communication network, the computer has a device for cryptographically protecting the predetermined project data, and specifically, using a hash function, for example. In this way, the project data remain secret, even from the usage-permission generating device. Hash functions are generally known, so that an explanation about hash functions can be omitted. The basic principle of a hash function is to compress data to be cryptographically protected to a so-called hash value.

The usage-permission generating device is able to sign the predetermined project data or their hash value transmitted from the computer via the communication network, and to transmit the resulting first signature via the communication network to the computer.

To be able to identify the client who is requesting the use of the data processing unit, the computer has a second signature device for generating a second signature from the predetermined project data. The computer is able to transmit the second signature and the predetermined project data belonging to it, via a communication network to the usage-permission generating device. The usage-permission generating device is designed to verify the second signature, the first signature device only generating the first signature if the second signature is correct.

Alternatively, the second signature device of the computer may also generate a second signature from the predetermined, cryptographically protected project data, the computer then transmitting the second signature and the predetermined, cryptographically protected project data belonging to it, via the communication network to the usage-permission generating device. The usage-permission generating device is in turn designed to verify the second signature, the first signature device only generating the first signature if the second signature is correct.

If the use of the data processing unit is with costs, the communication system may have a device for generating an invoice data record as a function of the predetermined project data of a selected project. The device for generating an invoice data record is preferably assigned to the first signature device. The first signature device and the device for generating an invoice data record may be implemented in a computer assigned to the software provider. It is important to point out that, for the usage of the data processing unit for processing project data, the client only has to pay once for a project, provided the predetermined project data are not changed. Therefore, in the course of processing a project, all other project data not predetermined may be changed by the client as frequently as desired, without additional costs accruing. Costs accrue for the client only if the predetermined project data for the project to be processed must be changed.

Alternatively, the usage-permission generating device assigned to a software provider may be a chip card which contains the first signature device. A chip card reader for receiving the chip card is then assigned to the computer.

For the case when the usage of the data processing unit is intended to be with costs, the chip card may be implemented in such a way that only a certain number of signatures is generated. For example, the chip card has a counter having a predetermined count which is reduced each time by one when predetermined project data of a selected project are to be signed. The count of the counter corresponds to a monetary value which the client must pay in advance, e.g., by purchasing the chip card.

Alternatively, the first signature device may also be implemented in the computer of the client.

To permit use of the data processing unit with costs, it is also conceivable to store value units in a memory of the computer, which are devalued accordingly in response to each request for usage of the data processing unit. The client must purchase the value units in advance.

The value units, which may be random numbers, may be input by the client into the computer. Alternatively, the value units may be requested via the communication network from the provider of the data processing unit, and transmitted from the provider, e.g., by E-mail to the computer of the client.

The value units, together with the predetermined project data or the predetermined, cryptographically protected project data to be signed, may be transmitted to the usage-permission generating device and devalued there, before the first signature is generated from the predetermined project data or the predetermined, cryptographically protected project data. The present invention is explained in greater detail below on the basis of several exemplary embodiments in conjunction with the accompanying drawing.

Figure 2:
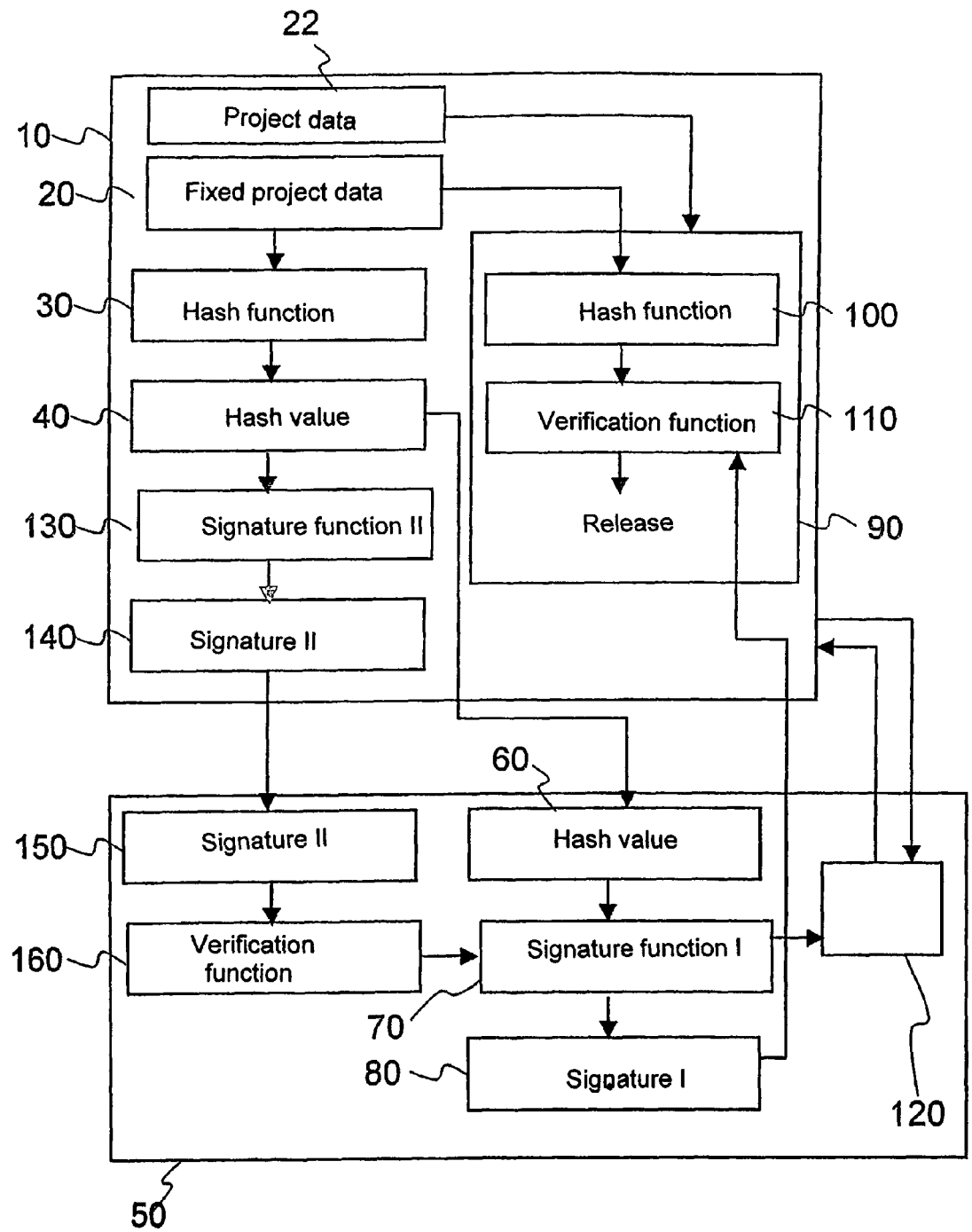
Figure 3:
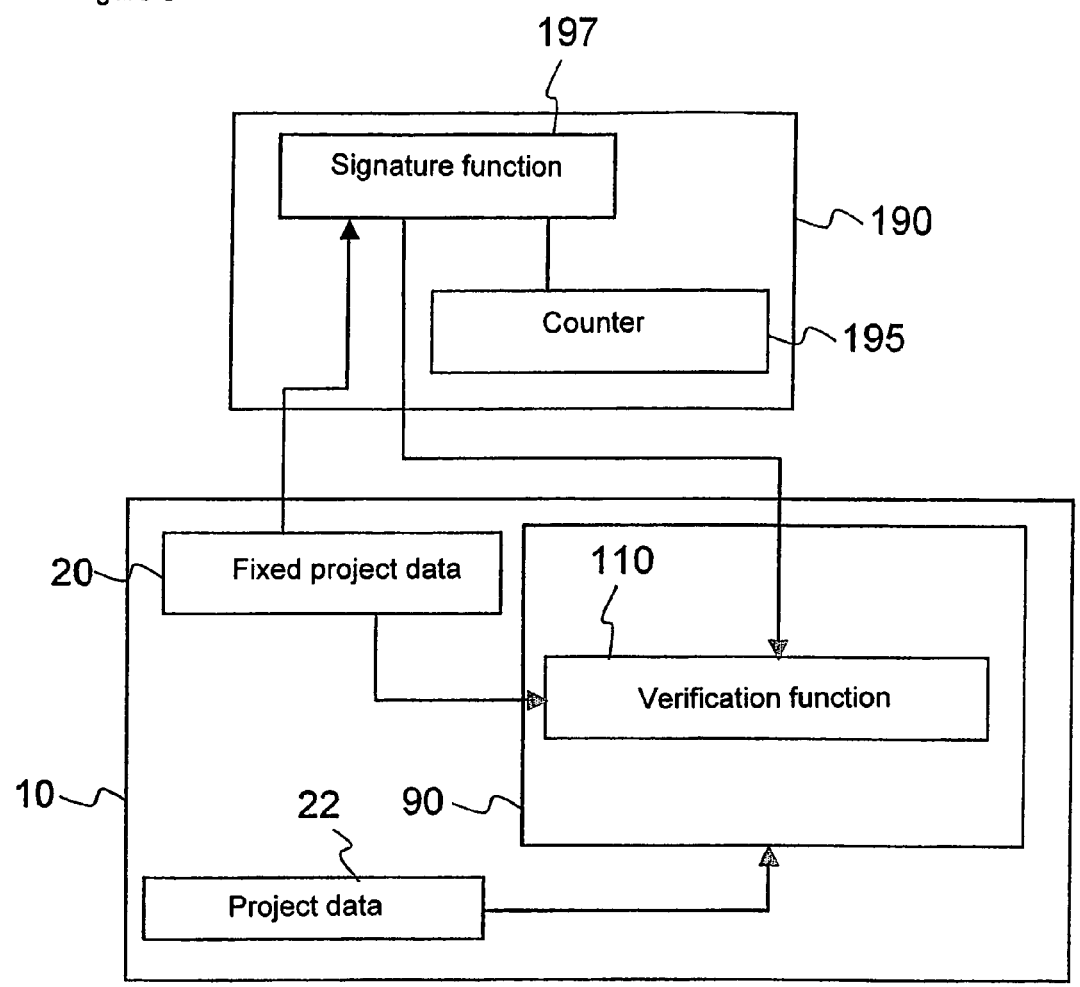

The figures show:

FIG. 1 a schematic block diagram of a communication system according to the present invention;

FIG. 2 a schematic block diagram of an alternative communication system according to the present invention; and FIG. 3 a chip card having an integrated signature device, which may be connected to the computer shown in FIGS. 1 and 2.

FIG. 1 shows an exemplary communication system which includes a computer 10 installed at a client. Computer 10 has a memory 20, in which the predetermined project data of at least one project may be stored. The predetermined project data are fixed project data of a project. Over and above that, there are also variable project data which may be stored in a memory 22. Computer 10 may further have a device 30 for cryptographically protecting predetermined project data. To that end, cryptographic protection device 30 performs a hash function using the predetermined project data. As a result, cryptographic protection device 30 delivers a hash value of the predetermined project data, which may be stored in a memory 40. Also implemented in the computer is a data processing unit 90 which may be designed as a hardware- and/or software component. In data processing unit 90, a cryptographic protection device 100 is again provided, to which the fixed project data of a selected project are fed. Cryptographic protection device 100 is connected to a verification device 110.

According to the exemplary embodiment in FIG. 1, computer 10 is connected via a communication network, e.g., the Internet, to a usage-permission generating device 50, hereinafter called computing device for short, which is assigned to a software provider. Computing device 50 may have a memory 60 in which the hash value of the predetermined project data coming from computer 10 is stored. Memory 60 is connected to a signature device 70 which signs the hash value using a secret key. Signature I generated in signature device 70 may be stored in a memory 80. Computing device 50 transmits signature I, stored in memory 80, via the communication network to computer 10. In computer 10, received signature I is fed to verification device 110. Verification device 110 is advantageously based upon an asymmetrical signature function, e.g., the so-called RSA method. Verification device 110 is designed, with the aid of the hash value generated in cryptographic protection device 100 and with the aid of received signature I, to determine whether signature I is correct. If verification device 110 determines that signature I submitted to it is genuine, i.e., actually comes from the first signature device, data processing unit 90 is released for processing the project data belonging to the selected project.

A memory 170 for storing value units may be provided in computer 10. These value units are paid for in advance by the client and, upon request of the client, for example, are generated in computing device 50, transmitted via the communication network and loaded into memory 170. The devaluation of the value units may take place in computer 10, or else be brought about by transmitting value units from memory 170 via the communication network to a devaluation device 180 of computing device 50. The value units may be transmitted in encrypted or unencrypted fashion from computer 10 to computing device 50.

In one advantageous refinement, signature device 70 only signs the hash value transmitted by computer 10 when a suitable number of value units have been devalued in devaluation device 180. To this end, devaluation device 180 delivers a corresponding trigger signal to signature device 70. This ensures that the usage of data processing unit 90 is only released when the client has paid the amount due.

FIG. 2 shows an alternative communication system.

In contrast to computer 10 shown in FIG. 1, computer 10 shown in FIG. 2 also has a signature device 130 which signs the hash value stored in memory 40. This signature II may be stored in a memory 140. Signature device 130 is used to give software providers the possibility of checking whether the client requesting use of data processing unit 90 is also actually the client from whom the hash value of the predetermined project data comes. To check signature II, a verification device 160 is implemented in computing device 50. Verification device 160 is preferably assigned a memory 150 in which signature II, generated by signature device 130, may be stored. Like computing device 50 according to FIG. 1, computing device 50 shown in FIG. 2 has a signature device 70, a memory 60 for storing a hash value coming from computer 10, as well as a memory 80 for storing signature I generated in signature device 70.

Verification device 160 is connected to signature device 70. Signature device 70 forms a signature I via the hash value coming from computer 10 only when verification device 160 signals that signature II coming from computer 10 is correct. Moreover, computing device 50 shown in FIG. 2 may include a device 120 for creating an invoice data record. An invoice data record is generated when signature device 70 has generated a signature I. The invoice data record may be transmitted from computing device 50 via the communication network to computer 10, and output there, for example, as an invoice on a printer (not shown).

FIG. 3 shows an alternative specific embodiment of signature device 70 shown in FIGS. 1 and 2. According to that, a signature device 197 is implemented in a chip card 190. Chip card 190 may be inserted into a chip card reader (not shown), which may be connected externally to a computer 10. However, the chip card reader may also be implemented in computer 10 itself. Computer 10 has a memory 20, in which predetermined project data of at least one project may be stored. The other variable project data of at least one project are stored in a further memory 22. Computer 10 further features a data processing unit 110 having a verification device.

The fixed project data stored in memory 20 of computer 10 are transmitted to signature device 197 of chip card 190 as soon as the client requests use of a data processing unit 90. The fixed project data are signed and transmitted as signature to verification device 110. As FIG. 3 further shows, memory 20 is likewise connected to verification device 110. It should be noted that verification device 110 may be designed as a software and/or hardware component. If verification device 110 determines that the signature coming from signature device 197 is correct, data processing unit 90 is released for processing the project data belonging to a selected project.

If the use of data processing unit 90 is intended to be with costs, then a counter 195 whose count corresponds to a specific monetary value may be implemented in chip card 190. The count is reduced each time by one when signature device 197 signs predetermined project data of a selected project. The client may purchase chip card 190 having a predetermined count, so that he/she has paid in advance for the project-specific use of data processing unit 90 with costs.

The functioning method of the communication system is explained in greater detail in the following on the basis of an exemplary embodiment in conjunction with FIG. 2.

Let us assume that the client would like to lay optical waveguides between Munich and Darmstadt. A great deal of project data belongs to this project, such as line length L between Munich and Darmstadt, fiber types and the fiber attenuation of the optical waveguides to be used. Let us further assume that the "line length" project data are specified by the client as fixed project data. The "fiber type" and "fiber attenuation" project data are free, i.e., variable project data. Line length L between Munich and Darmstadt is stored as fixed project data in memory 20. The remaining project data may be stored in memory 22 or input via the keyboard of computer 10 as needed.

The client would now like to have the project "Laying of Optical Waveguides between Munich and Darmstadt" computed by data processing unit 90. To be able to use data processing unit 90 for the selected project, the client must first of all request a usage right or ask for the release of the data processing unit. The usage rights are requested by first generating a corresponding hash value in cryptographic protection device 30 for line length L stored in memory 20. To increase the level of protection, the hash value is signed in signature device 130. Both the hash value and signature II of the hash value are subsequently transmitted by E-mail via the communication network to computing device 50. Signature device 130 may be based on a standard method such as Pretty Good Privacy (PGP). Alternatively, a signature function may also be carried out when generating the hash value in cryptographic protection device 40. It is important that signature II generated in signature device 130 be generated with a secret key not known to the provider of data processing unit 90. The hash value and signature II transmitted by E-mail are stored in memory 60 and 150, respectively, of computing device 50. Signature II is subsequently fed to verification device 160 which, using known methods, checks whether signature II generated in signature device 130 is correct. If signature II is correct, signature device 70 is induced to sign the hash value stored in memory 60. The signed hash value may be stored in memory 80, for example. Signature device 70 uses a secret key which is independent of the secret key of signature device 130 of computer 10. Signature I stored in memory 80 is fed, for example, by E-mail via the communication network to computer 10, and from there to verification function 110. A hash value is generated in cryptographic protection device 100 for line length L stored in memory 20, and is likewise fed to verification function 110. Using known asymmetrical signature functions, verification device 110 checks whether signature I coming from computing device 50 is correct. If the signature is correct, data processing unit 90 is released, and the project data belonging to the project "Laying of Optical Waveguides between Munich and Darmstadt" which are stored, for instance, in memories 20 and 22, are input into data processing unit 90 for processing.

With the creation of signature I in signature device 70, device 120 is induced to generate a corresponding invoice data record which is likewise transmitted, e.g., by E-mail to computer 10. The invoice data record may be converted into an invoice and output via a printer (not shown). To be able to create an invoice data record as a function of the predetermined project data stored in memory 20, certain parameters, such as quantity and type of project data predetermined for a selected project, or the predetermined project data itself, are transmitted from computer 10 to device 120. The parameters may be transmitted to computing device 50 in encrypted form. Computing device 50 or device 120 is able to decrypt the encrypted parameters again.

What is claimed is:

1. A method for releasing a data processing unit for processing project data of a project; comprising:
   requesting usage permission for using the data processing unit to process project data belonging to a predetermined project, the predetermined project data being cryptographically protected;
   transmitting the predetermined, cryptographically protected project data via a communication network to a usage-permission generating device;
   generating a first signature by signing the predetermined, cryptographically protected project data belonging to the project, the predetermined, cryptographically protected project data being signed by the usage-permission generating device;
   verifying the first signature for correctness;
   releasing the data processing unit to process the project data belonging to the project if the first signature is verified as correct; and
   assigning a client a plurality of value units for the release of the data processing unit for multiple projects, wherein the plurality of value units are devalued at a usage permission generating device in response to a request generated under usage of the verified first client signature for a usage right.

2. The method as recited in claim 1, further comprising:
   generating a second signature by signing the predetermined project data;
   transmitting the predetermined project data and the second signature to the usage-permission generating device;
   verifying the second signature for correctness; and
   the first signature is generated from the predetermined project data only if the second signature verified as correct.

3. The method as recited in claim 1, further comprising:
   generating a second signature by signing the predetermined, cryptographically protected project data;
   transmitting the predetermined, cryptographically protected project data and the second signature to the usage-permission generating device;
   verifying the second signature for correctness; and
   generating the first signature from the predetermined, cryptographically protected project data only if the second signature is correct.

4. The method as recited in claim 1, further comprising generating an invoice data record for usage of the data processing unit for the client as a function of the predetermined project data.

5. A communication system for releasing a data processing unit for processing project data of a selected project, comprising:
   a computer assigned to a client;
   a data processing unit implemented in the computer;
   a memory device, the memory device being a part of data processing unit and in which predetermined project data of at least one project to be processed are stored;
   a memory assigned to the computer in which at least one value unit for release, with costs, of the data processing unit for processing project data of at least one selected project is stored for at least one client;
   a device for devaluing the at least one value unit; and
   a usage-permission generating device assigned to the computer, the usage-permission generating device including:
      a first device for generating a first signature from the predetermined project data of a selected project,
   wherein the computer has a device for verifying the first signature and for releasing the data processing unit, which releases the data processing unit for processing the project data belonging to the selected project only if the first signature is determined correct and for which predefined value units are available as assigned for the release of the data processing unit, wherein the plurality of value units are devalued in response to a request by the client for a usage right.

6. The communication system as recited in claim 5, further comprising:
   a first interface associated with the computer, the interface being used for connection to a communication network;
   a device associated with the computer for cryptographically protecting the predetermined project data; and
   a second interface associated with the usage-permission generating device, the interface being used for connection to a communication network so that the first signature can be transmitted via the communication network to the computer.

7. The communication network as recited in claim 5, wherein the computer is assigned a second signature device for generating a second signature from the predetermined project data; the computer is designed for transmitting the second signature and the associated, predetermined project data via a communication network to the usage-permission generating device; and further comprising:
   a second device for verifying the second signature, the second device being associated with the usage-permission generating device, wherein the first signature device generates the first signature only if the second signature is determined correct.

8. The communication network as recited in claim 6, wherein the computer is assigned a second signature device for generating a second signature from the predetermined, cryptographically protected project data; the computer is designed for transmitting the second signature and the associated, predetermined, cryptographically protected project data via the communication network to the usage-permission generating device; and further comprising:
   a second device for verifying the second signature, the second device being associated with the usage-permission generating device, wherein the first signature device generates the first signature only if the second signature is determined correct.

9. The communication system as recited in claim 5, further comprising:
   a device for generating an invoice data record for the client for usage of the data processing unit as a function of the predetermined project data of a selected project.

10. The communication system as recited in claim 5, wherein the usage-permission generating device is a chip card in which the first signature device is implemented and which is able to generate a predetermined number of first signatures; and further comprising:
    a chip card reader assigned to the computer.

* * * * *